(12) United States Patent
Chang et al.

(10) Patent No.: US 11,686,893 B2
(45) Date of Patent: Jun. 27, 2023

(54) BACKLIGHT MODULE AND DISPLAY DEVICE

(71) Applicant: Radiant Opto-Electronics Corporation, Kaohsiung (TW)

(72) Inventors: Cheng-Te Chang, Kaohsiung (TW); Hung-Wei Chuang, Kaohsiung (TW); Yu-Ju Lee, Kaohsiung (TW); Pei-Fen Hou, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/948,391

(22) Filed: Sep. 20, 2022

(65) Prior Publication Data

US 2023/0099119 A1 Mar. 30, 2023

(30) Foreign Application Priority Data

Sep. 24, 2021 (WO) ................ PCT/CN2021/120297

(51) Int. Cl.
*F21V 8/00* (2006.01)
*F21V 7/04* (2006.01)
(Continued)

(52) U.S. Cl.
CPC .......... *G02B 6/0031* (2013.01); *F21V 7/0083* (2013.01); *F21V 7/041* (2013.01);
(Continued)

(58) Field of Classification Search
CPC ......... G02F 1/133605; G02F 1/133603; F21V 7/0083; F21V 7/041
See application file for complete search history.

(56) References Cited

U.S. PATENT DOCUMENTS

2010/0165472 A1* 7/2010 Hamasaki ................ B32B 3/26
428/319.3
2013/0128128 A1* 5/2013 Ikuta ................ G02F 1/133603
349/67
(Continued)

FOREIGN PATENT DOCUMENTS

CN 1693962 A 11/2005
CN 101358713 A 2/2009
(Continued)

*Primary Examiner* — Eric T Eide

(57) ABSTRACT

A backlight module comprises a back plate, a reflective sheet arranged on the back plate and forming a plurality of openings, a plurality of light-emitting elements located in the plurality of openings, at least one optical element arranged on the reflective sheet, and at least a supporting element configured between the back plate and the reflective sheet. The supporting element can move along with the reflective sheet. The supporting element has a base portion and a supporting portion extending from the base portion towards the optical element. The base portion of the supporting element is located between the back plate and the reflective sheet. The supporting portion of the supporting element passes through the reflective sheet to support the optical element. The supporting element is not a fixed design and can move along with the reflective sheet. Therefore, other plates under the reflective sheet do not require openings, which can improve assembly convenience and effectively reduce the mechanism interference caused by the expansion and contraction of the reflective sheet. The invention also provides a display device including the backlight module.

13 Claims, 5 Drawing Sheets

(51) Int. Cl.
  *F21V 7/00*   (2006.01)
  *F21V 17/06*  (2006.01)
  *F21Y 105/16*   (2016.01)

(52) U.S. Cl.
  CPC ............ *F21V 17/06* (2013.01); *G02B 6/0068* (2013.01); *G02B 6/0081* (2013.01); *F21Y 2105/16* (2016.08)

(56) References Cited

U.S. PATENT DOCUMENTS

| | | | |
|---|---|---|---|
| 2018/0107067 A1* | 4/2018 | Yamano | F21S 2/00 |
| 2019/0265551 A1* | 8/2019 | Liu | G02F 1/133608 |
| 2019/0285945 A1* | 9/2019 | Kyoukane | G02F 1/133611 |
| 2020/0326592 A1* | 10/2020 | Lin | G02F 1/133608 |
| 2021/0018797 A1* | 1/2021 | Kobayashi | G02F 1/133603 |

FOREIGN PATENT DOCUMENTS

| | | |
|---|---|---|
| CN | 102612622 A | 7/2012 |
| CN | 202551204 U | 11/2012 |
| CN | 104763903 A | 7/2015 |
| CN | 215895186 U | 2/2022 |
| TW | 200600901 | 1/2006 |
| TW | 200819865 | 5/2008 |
| TW | 201610514 A | 3/2016 |

\* cited by examiner

BACKLIGHT MODULE AND DISPLAY DEVICE

RELATED APPLICATIONS

This application claims priority of International Application No. PCT/CN2021/120297, filed on, Sep. 24, 2021. The entire disclosures of all the above applications are hereby incorporated by reference.

FIELD OF THE INVENTION

The present invention relates to an optical element, particularly a backlight module and a display device.

BACKGROUND OF THE INVENTION

Conventional backlight modules can be categorized into "side-lit type" and "direct-lit type". Since the light source of the direct-lit type backlight module is evenly distributed behind the display panel, the direct-lit type backlight module can obtain better image uniformity. The direct-lit type backlight module will have a reflective sheet on the circuit board to increase the brightness of the light source.

A support column is often provided between the bottom plate and the diffuser plate of the backlight module to support the diffuser plate upward. However, the conventional support column is usually embedded on the bottom plate. It is easy to have the problem of difficult assembly due to tolerances, which increases the assembly time and the defect rate.

SUMMARY OF THE INVENTION

One object of the present invention is to provide a backlight module that solves the above problems.

The backlight module comprising a back plate, a reflective sheet located on the back plate, a plurality of light-emitting elements, at least one optical element disposed on the reflective sheet, and at least one supporting element located between the back plate and the reflective sheet. The supporting element can move along with the reflective sheet. The reflective sheet forms a plurality of openings, and the light-emitting elements located in the openings. The supporting element has a base portion and a supporting portion extending from the base portion towards the optical element, the base portion of the at least one supporting element is located between the back plate and the reflective sheet, and the supporting portion of the at least one supporting element passes through the reflective sheet to support the optical element.

In a preferable embodiment, the expansion coefficient of the reflective sheet is greater than the expansion coefficient of the at least one supporting element.

In a preferable embodiment, the base portion of the at least one supporting element supports the reflective sheet.

In a preferable embodiment, the backlight module further comprises an adhesive element for fixing the reflective sheet. The adhesive member has a plurality of notch portions for accommodating the at least one supporting element, and the notch portions are not adhesive.

In a preferable embodiment, the reflective sheet includes a plurality of reflecting portions, each reflecting portion has a bottom wall and a surrounding wall connected to the bottom wall, the base portion of the at least one supporting element has at least one inclined surface. The shape of the at least one inclined surface is matched with the surrounding wall of anyone of the reflecting portions. In a preferable embodiment, the reflecting portions of the reflective sheet are arranged in a matrix, each of the surrounding wall of the reflecting portions has a plurality of first wall portions extending along a first direction and a plurality of second wall portions extending along a second direction, and the first direction and the second direction are non-parallel.

In a preferable embodiment, the at least one supporting element is selectively disposed on one of the first wall portions and the second wall portions of the reflective sheet, and the base portion of the at least one supporting element extends linearly.

In a preferable embodiment, the at least one supporting element is disposed at the intersection of one of the first wall portions and the adjacent second wall portion of the reflective sheet, and the base portion of the at least one supporting element extends linearly.

In a preferable embodiment, the at least one supporting element is disposed at the intersection of the first wall portions and the adjacent second wall portions of the reflective sheet. The base portion of the at least one supporting element extends in a cross shape. The supporting portion of the at least one supporting element is arranged at the intersection of the base portion.

In a preferable embodiment, a hole is selectively formed on a top edge of one of the first wall portions and the second wall portions of the reflective sheet. The supporting portion of the at least one supporting element passes through the hole of the reflective sheet to support the optical element.

In a preferable embodiment, a hole is formed on the top edge of the intersection of one of the first wall portion and the adjacent second wall portion of the reflective sheet. The supporting portion of the at least one supporting element passes through the hole of the reflective sheet to support the optical element.

In a preferable embodiment, a hole corresponding to the supporting portion of the at least one supporting element is formed on the reflective sheet. The supporting portion is cylindrical with a uniform diameter, the hole of the reflective sheet is the same diameter as the supporting portion, and the supporting portion of the at least one supporting element passes through the hole of the reflective sheet to support the optical element.

Another object of the present invention is to provide a display device which comprises the backlight module as described above, and a display panel arranged on the backlight module.

The characteristic of the present invention is that the supporting element is not fixed and can move along with the reflective sheet, therefore, the other plates under the reflective sheet do not need to be set up with a hole. It can improve the convenience of assembly and can also effectively reduce the mechanism interference caused by the expansion and contraction of the reflective sheet.

DETAILED DESCRIPTION OF THE INVENTION

The detailed description and preferred embodiments of the invention will be set forth in the following content and provided for people skilled in the art to understand the characteristics of the invention.

Figure 1:
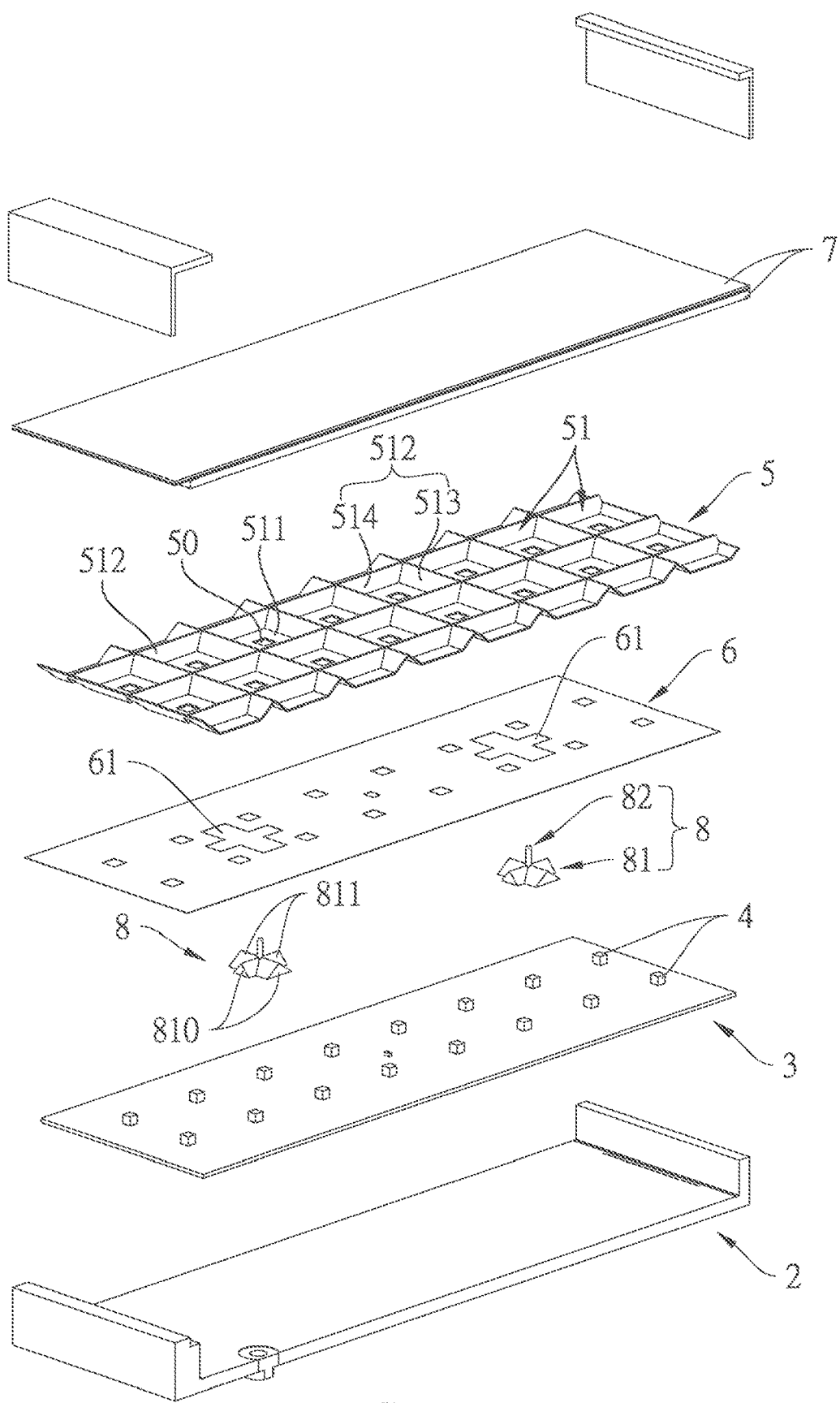
FIG. 1 is an exploded diagram of a backlight module according to a preferred embodiment of this invention.
Figure 2:
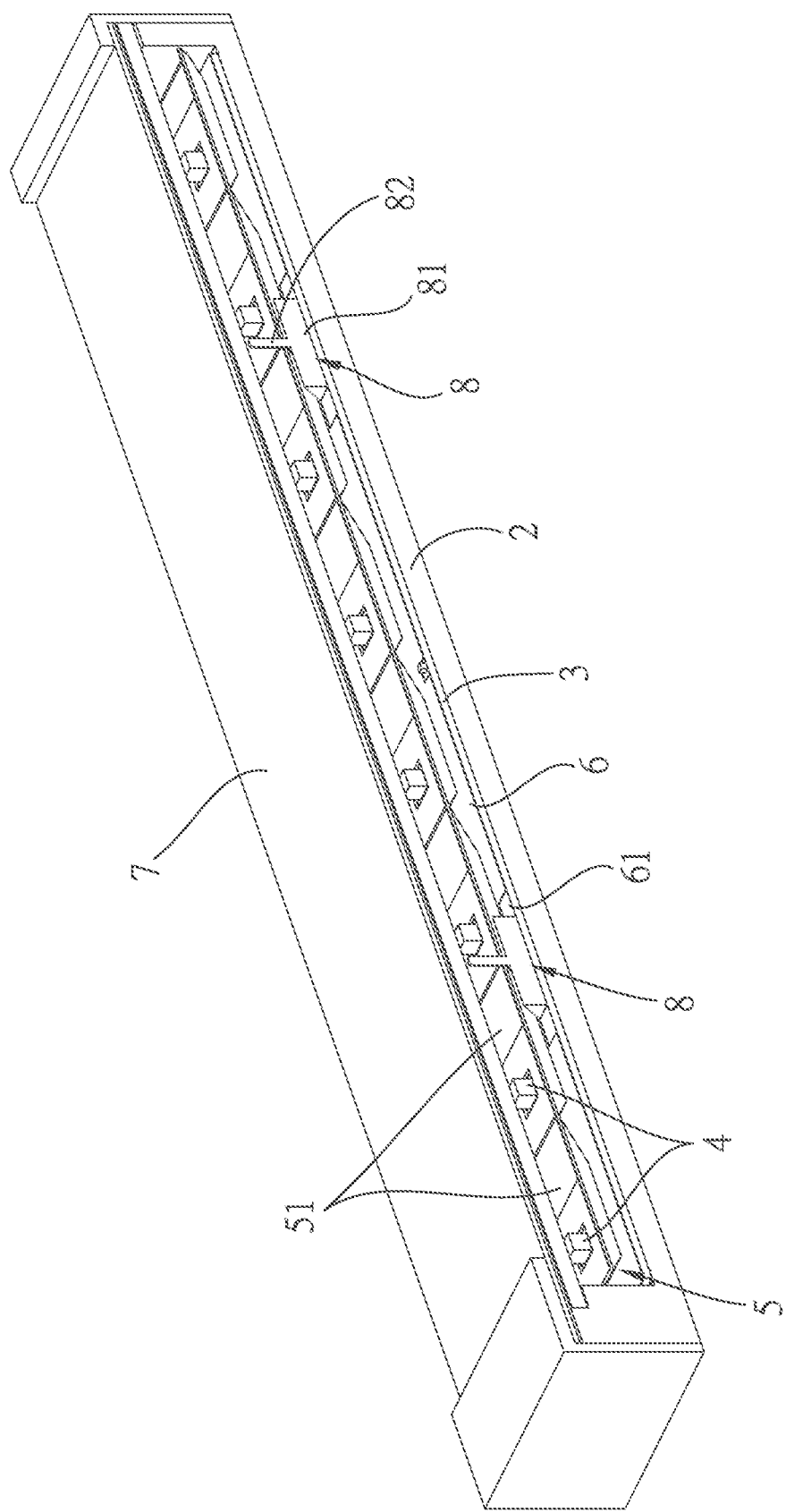
FIG. 2 is a cross-sectional diagram illustrating the assembled structure of FIG. 1.

Referring to FIG. 1 and FIG. 2, it is a first preferred embodiment of the backlight module of the present invention. The backlight module comprises a back plate 2, a circuit board 3 disposed on the back plate 2, a plurality of light-emitting elements 4 arranged on the circuit board 3, a reflective sheet 5 disposed on the circuit board 3 and forming a plurality of openings 50, a plurality of optical elements 7 arranged on the reflective sheet 5, and at least one supporting element 8 located between the back plate 2 and the reflective sheet 5. The number of the supporting element 8 can be adjusted according to the specification of the backlight module. In this embodiment, two supporting elements 8 are used as an example for illustration, and the optical elements 7 can be a plurality of stacked optical films. The supporting elements 8 can move along with the reflective sheet 5, it means that the supporting elements 8 are not fixed design. Therefore, the other plates under the reflective sheet 5 do not need to be set up with a hole, which can improve the convenience of assembly and effectively reduce the mechanism interference caused by the expansion and contraction of the reflective sheet 5.

Next, other designs of this embodiment will be described. As shown in FIG. 1, the reflective sheet 5 includes a plurality of reflecting portions 51 arranged in a matrix. Each reflecting portion 51 has a bottom wall 511 and a surrounding wall 512 connected to the bottom wall 511. The openings 50 of the reflective sheet 5 are located on the bottom wall 511 of the reflecting portions 51 respectively. It should be noted that, in this embodiment, the number of the circuit boards 3 is one, and the circuit board 3 is stacked on the back plate 2. The light-emitting elements 4 are arranged on the circuit board 3 in a matrix and located in the corresponding reflecting portions 51 by passing through the openings 50 on the bottom walls 511 of the reflecting portions 51 respectively. As shown in FIG. 2, in this embodiment, the backlight module further comprises an adhesive element 6 for fixing the reflective sheet 5. The adhesive element 6 is used to attach the reflective sheet 5 to the circuit board 3, but the adhesive element 6 is not an essential component. The reflective sheet 5 can be fixed by other components without being attached to the circuit board 3. Furthermore, the adhesive element 6 has a plurality of notch portions 61, the notch portions 61 have no adhesive properties, and the supporting elements 8 are located in the notch portions 61. With the design of the notch portions 61, when the adhesive element 6 attaches the reflective sheet 5 to the circuit board 3, the supporting element 8 will not be attached to the circuit board 3 at the same time. Therefore, the supporting element 8 is not fixed on the circuit board 3. In other embodiments, the circuit board 3 may be a plurality of strip-like structures arranged at intervals, and the adhesive element 6 has a plurality of strip elements disposed on the back plate 2 at intervals to adhere the reflective sheet 5 on the back plate 2. The notch portions 61 can be non-adhesive areas between the strip elements and can also accommodate the supporting elements 8 instead of fixing the supporting elements 8 to the back plate 2.

As shown in FIG. 1 and FIG. 2, each of the supporting elements 8 has a base portion 81 and a supporting portion 82 extending from the base portion 81 towards the optical element 7. The base portion 81 of each of the supporting elements 8 is located between the back plate 2 and the reflective sheet 5. The supporting portion 82 of each of the supporting elements 8 passes through the reflective sheet 5 to support the optical element 7.

Compared with the prior art, which requires holes to be formed on both the back plate (or the circuit board) and the reflective sheet to assemble the supporting element, the supporting elements 8 of the present embodiment do not pass through the back plate 2 (or the circuit board 3). There is no need to carry out the prefabrication operation of assembling the supporting elements 8 on the back plate 2 (or the circuit board 3), and there is no need to make assembly holes in the back plate 2 (or the circuit board 3), which can reduce the manufacturing cost. In particular, the circuit board 3 is a high-priced component, and the risk of making additional holes is too high. In addition, the circuit board 3 with additional holes is difficult to be used in other models, which does not contribute to reduce the inventory cost.

In this embodiment, the supporting portion 82 of each of the supporting elements 8 only needs to pass through the reflective sheet 5 without passing through the circuit board 3, and the assembly procedure can be completed when the reflective sheet 5 is attached to the circuit board 3. It can simplify the alignment procedures, reduce working-hours and defective rate, and improve the convenience of assembly.

In addition, the supporting elements 8 of the present embodiment are penetrated through the reflective sheet 5 and can move along with the reflective sheet 5, which is not fixed on the circuit board 3 (or the backplane 2). Therefore, the supporting element 8 is a non-fixed design. When the reflective sheet 5 is slightly shifted due to expansion and contraction, the supporting elements 8 will move synchronously to avoid the mechanism interference between the reflective sheet 5 and the supporting elements 8. Furthermore, in other embodiments, the expansion coefficient of the reflective sheet 5 is greater than the expansion coefficient of the supporting elements 8, therefore, when the reflective sheet 5 moves slightly due to thermal expansion and contraction, the supporting elements 8 will move synchronously in a smaller manner due to the smaller expansion coefficient.

In addition, the reflective sheet 5 and the optical element 7 are both supported by the supporting elements 8. Specifically, the base portions 81 support the reflective sheet 5, and the supporting portions 82 support the optical element 7. This can effectively ensure that the distance between the reflective sheet 5 and the optical element 7 remains the same, and it is not easy to change the distance due to thermal expansion and contraction, thereby affecting the optical quality.

Referring to FIG. 1, the base portion 81 of each of the supporting elements 8 has at least one inclined surface 811, and the shape of the inclined surface 811 is matched with the surrounding wall 512 of each of the reflecting portion 51. More specifically, in this embodiment, each base portion 81 has two triangular pillars 810 extending in a cross shape, and each triangular pillar 810 is formed with the inclined surface 811 on two opposite sides. The surrounding wall 512 of each of the reflecting portions 51 has a plurality of first wall portions 513 extending along a first direction and a plurality of second wall portions 514 extending along a second direction, wherein, the first direction and the second direction are non-parallel.

In this embodiment, each of the supporting elements 8 is disposed at the intersection of one of the first wall portions 513 and the adjacent second wall portions 514 of the reflective sheet 5. The inclined surfaces 811 of one of the triangular pillars 810 of the base portion 81 are matched with the first wall portions 513 of the two adjacent reflecting portions 51. The inclined surfaces 811 of the other triangular pillar 810 of the base portion 81 are matched with the second wall portions 514 of the two adjacent reflecting portions 51. Since the inclined surfaces 811 is matched with the first wall portions 513 or the second wall portions 514, sufficient supporting force can be provided for the reflective sheet 5, and at the same time, the supporting elements 8 can be limited to a fixed position on the bottom surface of the reflective sheet 5.

Figure 3:
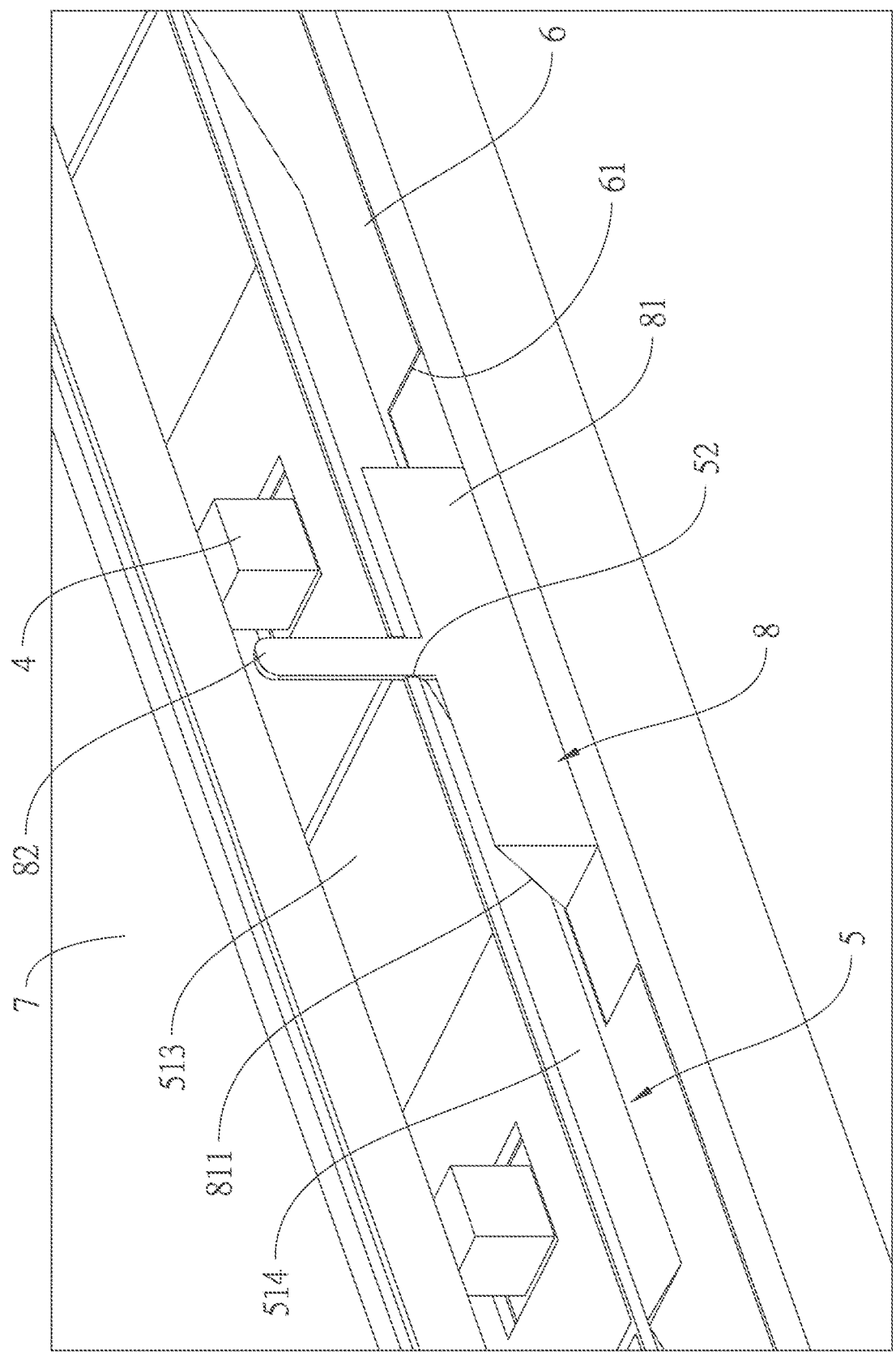
FIG. 3 is a partial enlarged diagram to assist in explaining FIG. 2.

As shown in FIG. 3, the supporting portion 82 of each of the supporting elements 8 is disposed at the intersection of the two triangular pillars 810 of the base portion 81. A hole 52 is formed at the top edge of the intersection of one of the first wall portions 513 and the adjacent second wall portion 514 of the reflective sheet 5. The supporting portion 82 of the support member 8 passes through the hole 52 of the reflective sheet 5 to support the optical element 7. Therefore, the supporting elements 8 do not need to be assembled to the back plate 2 (or the circuit board 3) in advance. In addition, since the cost of the reflective sheet 5 is lower than that of the circuit board 3, the difficulty and processing cost of making the holes 52 in the reflective sheet 5 can also be reduced. In this embodiment, each of the supporting portions 82 is cylindrical with a uniform diameter, and each of the holes 52 of the reflective sheet 5 has the same diameter with each of the supporting portions 82. This design can ensure that when the reflective sheet 5 is slightly shifted due to thermal expansion and cold contraction, the holes 52 of the reflective sheet 5 do not need to be enlarged to provide the offset margin for the supporting portions 82. Therefore, it can avoid the risk of light leakage from the holes 52 due to the enlargement of the holes 52 and improve the optical quality.

Figure 4:
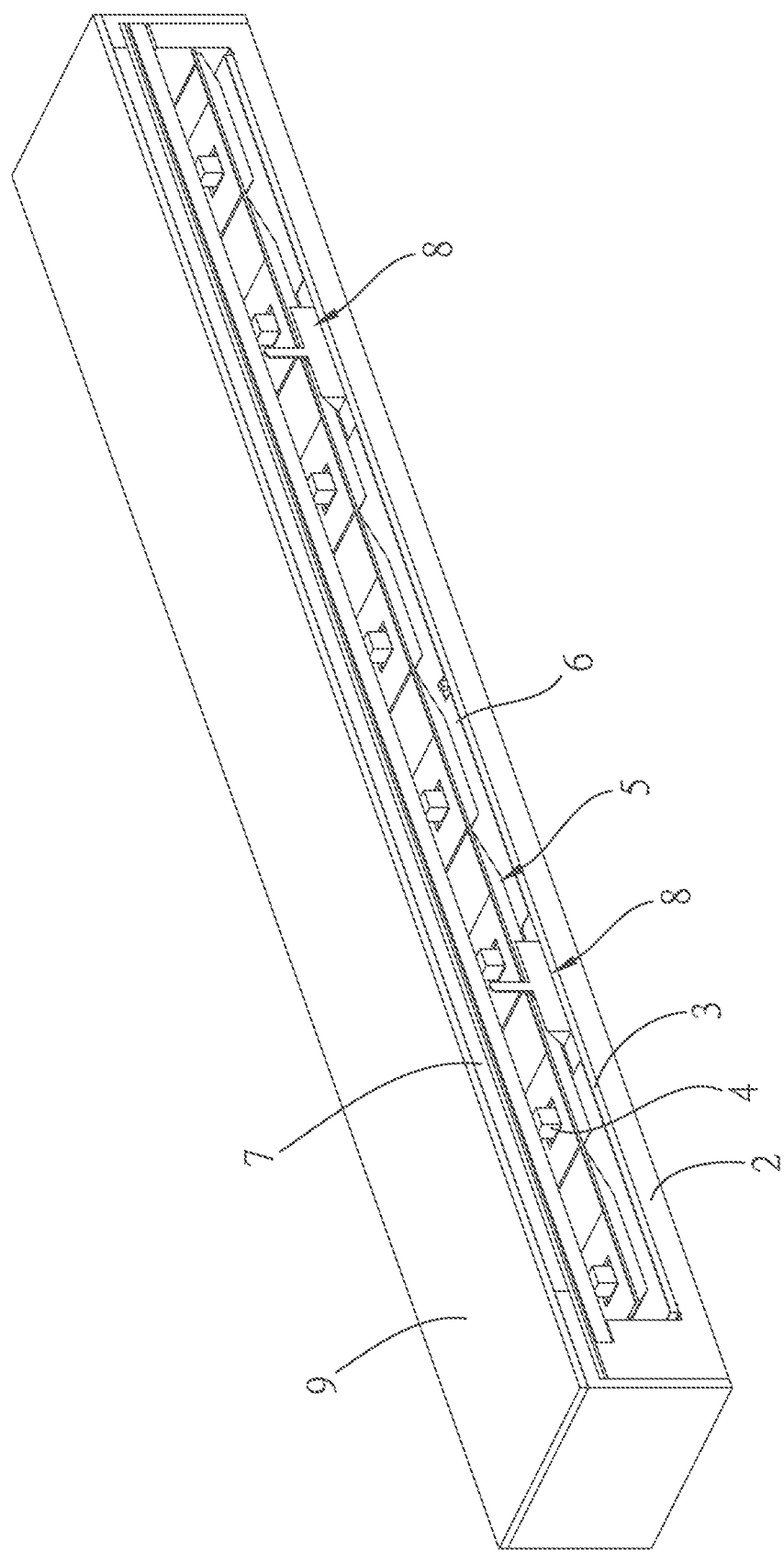
FIG. 4 is a cross-sectional diagram of a display device according to a preferred embodiment of this invention.

After the back plate 2, the circuit board 3, the adhesive element 6, the supporting elements 8, the reflective sheet 5, and the optical element 7 are assembled, the assembly procedure of the backlight module of the present invention is completed. A display panel 9 is arranged on the light-emitting side of the backlight module to form a display device as shown in FIG. 4.

Figure 5:
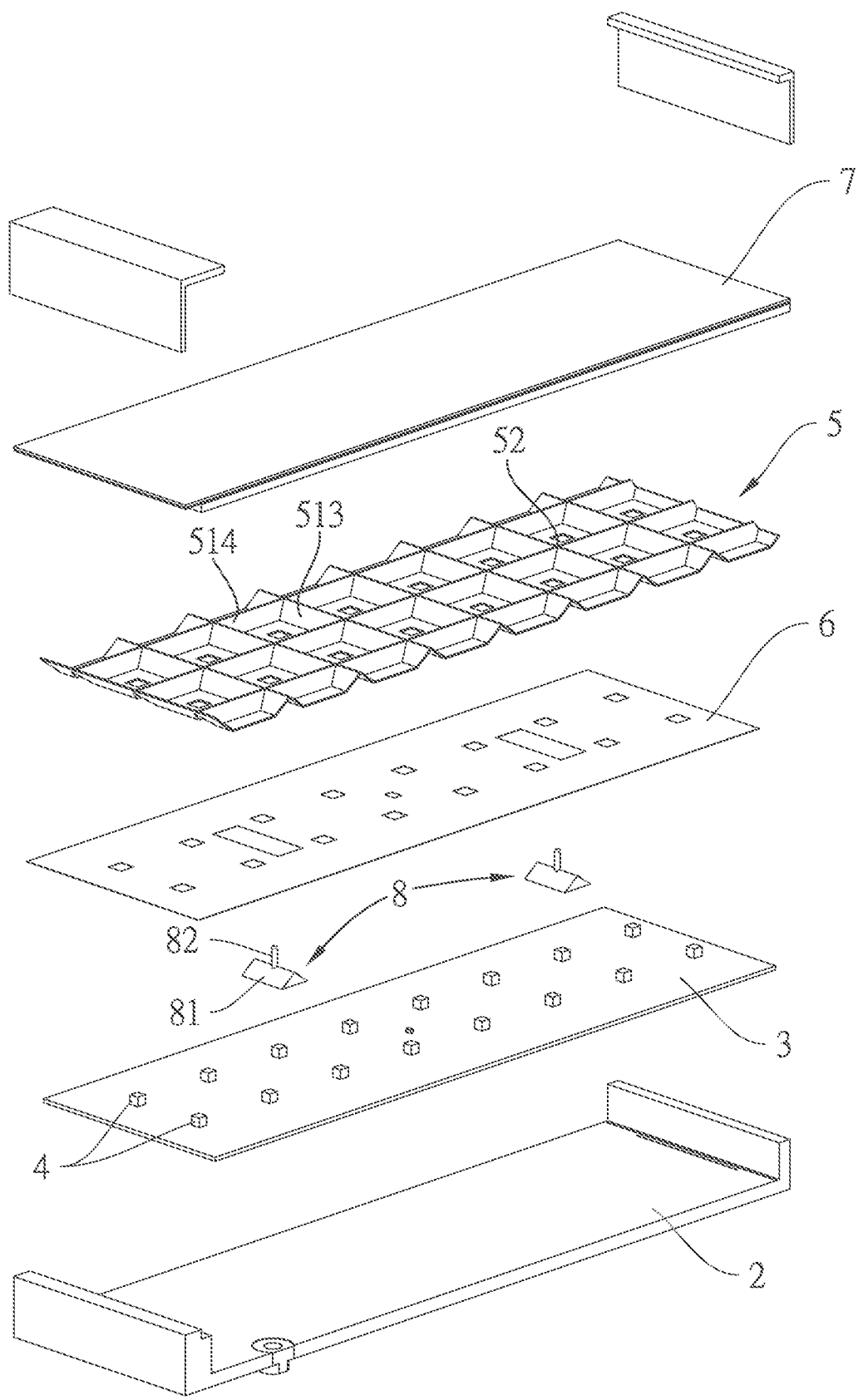
FIG. 5 is an exploded diagram illustrating another type of a supporting element.

As shown in FIG. 5, in some embodiments, the base portion 81 of each of the supporting elements 8 may also extend linearly. At this time, each of the supporting elements 8 can also be disposed at the intersection of one of the first wall portions 513 and the adjacent second wall portion 514 of the reflective sheet 5, and the supporting portion 82 of each of the supporting elements 8 passes through the hole 52 of the reflective sheet 5 to support the optical element 7. In some embodiments, each of the supporting elements 8 may also be selectively disposed on one of the first wall portions 513 and the second wall portions 514 of the reflective sheet 5. At this time, each of the holes 52 is formed on one of the first wall portions 513 and the second wall portions 514. Each of the holes 52 is not limited to be formed on the linear position of anyone of the first wall portions 513 or the second wall portions 514, it may also be formed at the intersection of one of the first wall portions 513 and the adjacent second wall portion 514. Both positions are located on the top edge of the first wall portions 513 and/or the second wall portions 514 without damaging the inclined wall surface of the first wall portions 513 or the second wall portions 514 and avoid affecting the reflection of light.

To sum up, in the backlight module and the display device of the present invention, the supporting elements 8 are not fixed design and can move along with the reflective sheet 5. Therefore, the other plates under the reflective sheet 5 do not need to be set up with holes, which can improve the convenience of assembly and effectively reduce the mechanism interference caused by the expansion and contraction of the reflective sheet 5. This design concept can be used in medium and large size direct-lit type backlight module, such as in-vehicle equipment or TV.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a back plate;
   a circuit board disposed on the back plate;
   a reflective sheet located on the back plate, wherein the reflective sheet forms a plurality of openings;
   a plurality of light-emitting elements located in the openings and arranged on the circuit board;
   at least one optical element disposed on the reflective sheet;
   at least one supporting element located between the back plate and the reflective sheet, wherein the supporting element can move along with the reflective sheet, the supporting element has a base portion and a supporting portion extending from the base portion towards the optical element, the base portion of the at least one supporting element is located between the back plate and the reflective sheet, and the supporting portion of the at least one supporting element passes through the reflective sheet to support the optical element; and
   wherein the base portion of the at least one supporting element is not directly fixed to the circuit board or the back plate.

2. The backlight module as claimed in claim 1, wherein the expansion coefficient of the reflective sheet is greater than the expansion coefficient of the at least one supporting element.

3. The backlight module as claimed in claim 1, wherein the base portion of the at least one supporting element supports the reflective sheet.

4. The backlight module as claimed in claim 1, wherein the backlight module further comprises an adhesive element for fixing the reflective sheet, the adhesive member has a plurality of notch portions for accommodating the at least one supporting element, and the notch portions are not adhesive.

5. The backlight module as claimed in claim 1, wherein the reflective sheet includes a plurality of reflecting portions, each reflecting portion has a bottom wall and a surrounding wall connected to the bottom wall, the base portion of the at least one supporting element has at least one inclined surface, the shape of the at least one inclined surface is matched with the surrounding wall of anyone of the reflecting portions.

6. The backlight module as claimed in claim 5, wherein the reflecting portions of the reflective sheet are arranged in a matrix, each of the surrounding wall of the reflecting portions has a plurality of first wall portions extending along a first direction and a plurality of second wall portions extending along a second direction, and the first direction and the second direction are non-parallel.

7. The backlight module as claimed in claim 6, wherein the at least one supporting element is selectively disposed on one of the first wall portions and the second wall portions of the reflective sheet, and the base portion of the at least one supporting element extends linearly.

8. The backlight module m as claimed in claim 6, wherein the at least one supporting element is disposed at the intersection of one of the first wall portions and the adjacent second wall portion of the reflective sheet, and the base portion of the at least one supporting element extends linearly.

9. The backlight module as claimed in claim 6, wherein the at least one supporting element is disposed at the intersection of the first wall portions and the adjacent second wall portions of the reflective sheet, the base portion of the at least one supporting element extends in a cross shape, and the supporting portion of the at least one supporting element is arranged at the intersection of the base portion.

10. The backlight module as claimed in claim 6, wherein a hole is selectively formed on a top edge of one of the first wall portions and the second wall portions of the reflective sheet, and the supporting portion of the at least one supporting element passes through the hole of the reflective sheet to support the optical element.

11. The backlight module as claimed in claim 6, wherein a hole is formed on the top edge of the intersection of one of the first wall portions and the adjacent second wall portion of the reflective sheet, and the supporting portion of the at least one supporting element passes through the hole of the reflective sheet to support the optical element.

12. The backlight module as claimed in claim 1, wherein a hole corresponding to the supporting portion of the at least one supporting element is formed on the reflective sheet, the supporting portion is cylindrical with a uniform diameter, the hole of the reflective sheet is the same diameter as the supporting portion, and the supporting portion of the at least one supporting element passes through the hole of the reflective sheet to support the optical element.

13. A display device, comprising the backlight module as described in claim 1, and a display panel arranged on the backlight module.

* * * * *